United States Patent [19]

Nakagomi

[11] Patent Number: 4,836,087
[45] Date of Patent: Jun. 6, 1989

[54] HYDRAULIC CONTROL APPARATUS FOR VEHICLE

[75] Inventor: Yukinao Nakagomi, Saitama, Japan
[73] Assignee: Kayaba Industry Co., Ltd., Japan
[21] Appl. No.: 116,623
[22] Filed: Nov. 3, 1987
[51] Int. Cl.⁴ .............................................. F15B 13/04
[52] U.S. Cl. ........................................ 91/29; 91/516; 91/517; 91/532
[58] Field of Search ..................... 91/28, 29, 516, 517, 91/528, 532, 6

[56] References Cited

U.S. PATENT DOCUMENTS

| | | | |
|---|---|---|---|
| 4,385,674 | 5/1983 | Presley | 91/516 |
| 4,453,451 | 6/1984 | Streeter et al. | 91/28 |
| 4,553,389 | 11/1985 | Tischer | 91/532 |

*Primary Examiner*—Robert E. Garrett
*Assistant Examiner*—Thomas Denion

*Attorney, Agent, or Firm*—Steinberg & Raskin

[57] ABSTRACT

A hydraulic control apparatus for a vehicle capable of being significantly simplified in structure and stabilizing its control characteristics. The apparatus includes a variable constriction provided in a first flow passage arranged between a steering pump and a steering cylinder and a steering spool for changing over the first flow passage and controlling the degree of opening of the variable constriction. The apparatus also includes a single flow control valve spool which changes over depending on a variation of pressure on an upstream side of the variable orifice and accomplishes an increase and a decrease in the degree of opening of a second flow passage arranged between a switch pump and an implement circuit corresponding to an increase and a decrease in pressure on the upstream side of the variable constriction.

12 Claims, 5 Drawing Sheets

HYDRAULIC CONTROL APPARATUS FOR VEHICLE

BACKGROUND OF THE INVENTION

1. Field of the Invention

This invention relates to a hydraulic control apparatus for a vehicle, and more particularly to a hydraulic control apparatus which is adapted to be used for steering control of an industrial vehicle such as a shovel loader or the like.

2. Description of the Prior Art

Figure 1:
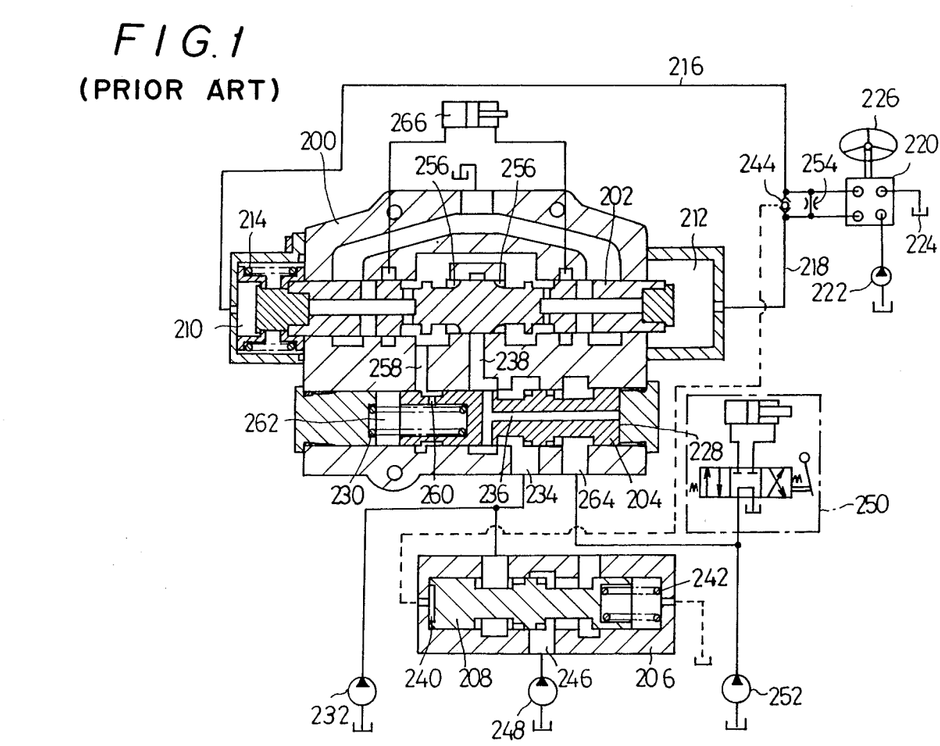
FIG. 1 is a vertical sectional view showing a conventional hydraulic control apparatus for a vehicle.

A hydraulic control apparatus of such type which as been conventionally known in the art is typically disclosed in Japanese Patent Application Laying-Open Publication No. 80038/1983 and constructed in such a manner as shown in FIG. 1. More particularly, the conventional hydraulic control apparatus generally comprises a main body 200 having a steering spool 202 and a first flow control valve spool 204 arranged therein and a subsidiary body 206 having a second flow control valve spool 208 arranged therein.

The steering spool 202 is connected at one end thereof to a pilot chamber 210 and at the other end thereof to a pilot chamber 212 a centering spring 214 is arranged to act on the one end of the steering spool 202.

The pilot chambers 210 and 212 are connected through passages 216 and 218 to a totally-hydraulic power steering unit 220. The power steering unit 220 is also connected to a pump 222 and a tank 224 and supplies a portion of oil discharge from the pump 222 proportional to the number of revolutions of a handle 226 to one of the passages 216 and 218, while the other passage communicates with the tank 224.

The first flow control valve spool 204 is connected at one end thereof to a pilot chamber 228 and engaged at the other end thereof with a spring 230 which acts on the spool 204 to normally hold it at a position shown in FIG. 1. Also, the main body 200 is so constructed that when oil discharged from a pump 232 flows into an inlet port 234 formed in the main body 200, discharge pressure of the pump 232 is transmitted through an oil passage 236 formed in the first flow control valve spool 204 to the spool 204. Thus, the first flow control valve spool 204 is moved against the spring 230, so that the inlet port 234 may communicate with a communication passage 238 in the main body 200.

The second flow control valve spool 208 inorported in the subsidiary body 206 is positioned at one end thereof in a pilot chamber 240 and engaged at the other end thereof with a spring 242 so that it may be normally held at such a position as shown in FIG. 1. The pilot chamber 240 is selectively connected through a shuttle valve 244 to one of the passages 216 and 218 having higher pressure so that it may be transmitted or applied to the pilot chamber 240.

When the pump 232 is driven, discharge pressure of the pump 232 is transmitted to the pilot chamber 228, resulting in the first flow control valve spool 204 being moved against the spring 230. This causes oil discharged from the pump 232 to flow into the communication passage 238. However, at this time, when the handle 226 is at a neutral position, the steering spool 202 is kept at the normal position shown in FIG. 1 to keep the communication passage 238 closed.

When the handle 226 is at the neutral position described above, pressure is not applied to the pilot chamber 240 of the subsidiary body 206 as well, so that the second flow control valve spool 208 may be kept at a normal position shown in FIG. 1. Accordingly, when oil discharged from a pump 248 flows into a port 246 formed in the subsidiary body 206, all the discharged oil flows into a drive circuit 250 on an implement side and merges with oil discharged from a pump 252 for supplying pressurized oil to the drive circuit 250.

In such a situation as described above, when the handle 226 is rotated, for example, in a clockwise direction, oil is discharged in an amount proportional to the number of revolutions of the handle 226 to the passage 216. The passages 216 and 218 are formed so as to communicate with each other through an orifice 254, so that the oil discharged to the passage 216 may be passed through the orifice 254. Passing of the oil through the orifice 254 causes a pressure difference to occur at the orifice 254. The pressure difference is varied depending on the amount of oil discharged from the power steering unit 220 or the number of revolutions of the handle 226.

The above-described pressure difference at the orifice 254 forms a pressure difference between the pilot chambers 210 and 212 in which both ends of the steering spool 202 are arranged, so that the amount of changeover of the steering spool 202 may be controlled depending on the number of revolutions of the handle 226. More specifically, rotation of the handle 226 in a large amount in the clockwise direction in FIG. 1 increases the pressure difference to cause the steering spool 202 to be moved or shifted by a large distance in a right direction in FIG. 1, whereas the rotation in a small amount causes the amount of shift of the spool to be decreased. When the amount of shift or movement of the steering spool 202 is increased, the degree of opening of the variable constriction formed by cooperation between the communication passage 238 and notches 256 formed at the spool 202 is increased, whereas a decrease in the amount of shift of the spool 202 causes the degree of opening of the constriction to be decreased.

Pressure on a downstream side of the variable constriction is applied through a through-hole 258 and a port 260 to a spring chamber 262.

For example, a decrease in the number of revolutions of the handle 226 causes the degree of opening of the variable constriction to be decreased, resulting in a pressure difference at the variable constriction being increased. This leads to an increase in a difference between pressure in the pilot chamber 228 to which pressure on the upstream side of the variable constriction is applied and pressure in the spring chamber 262 to which pressure on a downstream side of the variable constriction is applied. This causes the first flow control valve spool 204 to be substantially shifted against the spring 230 to communicate the port 234 with a port 264 formed in the main body 200.

Further, discharge of pressure oil from the pump 222 to the passage 216 as described above causes discharge pressure of the pump to be transmitted through the shuttle valve 244 to the pilot chamber 240, so that the second flow control valve spool 208 may be moved or shifted against the spring 242, resulting in the port 246 in the subsidiary body 206 communication with the port 234 in the main body 200.

Thus, the above-described operation causes oil discharged from the pump 232 to merge with that discharged from the pump 248. However, the degree of opening of the variable constriction is small, accordingly, the amount of oil supplied to a steering cylinder 266 is substantially limited and most of the oil is supplied through the port 264 to the drive circuit 250 on the implement side.

On the contrary, when the number of revolutions of the handle 226 is increased, the amount of oil discharged from the steering unit 220 is increased correspondingly, resulting in a pressure difference at the orifice 254 being increased. This leads to an increase in the amount of movement of the steering spool 202, so that the degree of opening of the variable constriction may be increased. Such an increase in the degree of opening of the variable constriction decreases a pressure difference at the variable constriction to reduce the amount of movement the first flow control valve spool 204, to thereby interrupt communication between the port 234 and the port 264.

Even in this instance, pilot pressure is applied to the pilot chamber 240, so that the second flow control valve spool 208 may be shifted against the spring 242 to accomplish communication between the port 234 and the port 264.

Thus, all oil discharged from the pump 232 and 248 is supplied to the steering cylinder 266.

As can be seen from the foregoing, in the conventional hydraulic control apparatus, a decrease in the number of revolutions of the handle 226 causes a part of oil discharged from the pump 232 to be fed to the steering cylinder 266, and the remaining oil and all oil discharged from the pump 248 are supplied to the drive circuit 250 on the implement side.

The more the number of revolutions of the handle 226 is increased, the more the amount of oil supplied to the steering cylinder 266 is increased, and when the amount of oil supplied to the cylinder 266 reaches a predetermined level, surplus oil from the pumps 232 and 248 is fed to the implement side.

Unfortunately, as can be seen from the foregoing, the conventional hydraulic control apparatus constructed as described above requires two such flow control valves, resulting in a complicated structure. Also, when there are variations in operational or functional characteristics of the flow control valve, the variations synergistically affect each other. This causes a problem of rendering control characteristics of the whole apparatus highly unstable.

Accordingly, it would be highly desirable to develop a hydraulic control apparatus for a vehicle which is capable of being significantly simplified in structure and stabilizing its control characteristics.

SUMMARY OF THE INVENTION

Generally speaking, in accordance with the present invention, a hydraulic control apparatus for a vehicle is provided. The hydraulic control apparatus includes a steering cylinder and a first pump and a second pump which are connected to the steering cylinder. Between the first pump and the steering cylinder a first flow passage is arranged in which a variable constriction is provided. The apparatus also includes a steering spool for changing over the first flow passage and controlling the degree of opening of the variable constriction and an implement circuit. Between the implement circuit and the second pump is arranged a second flow passage. The apparatus further includes a single flow control valve spool which changes over depending on a variation of pressure on an upstream side of the variable constriction and varies the degree of opening of the second flow passage depending on a variation of pressure on the upstream side of the variable constriction.

In a preferred embodiment, the first and second pumps comprise a steering pump and a switch pump, respectively.

Also, in a preferred embodiment of the present invention, the flow control valve spool increases and decreases the degree of opening of the second flow passage corresponding to an increase and a decrease in pressure on the upstream of the variable constriction.

Accordingly, it is an object of the present invention to provide a hydraulic control apparatus for a vehicle which is capable of being simplified in structure.

It is another object of the present invention to provide a hydraulic control apparatus for a vehicle which is capable of stabilizing its control characteristics.

It is a further object of the present invention to provide a hydraulic control apparatus for a vehicle which is capable of being manufactured at a low cost.

Still other objects and advantages of the invention will be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is had to the following description taken in connection with the accompanying drawings; wherein.

DETAILED DESCRIPTION OF THE PREFERRED EMBODIMENT

Now, a hydraulic control apparatus for a vehicle according to the present invention will be described hereinafter with reference to FIGS. 2 to 5.

Figure 2:
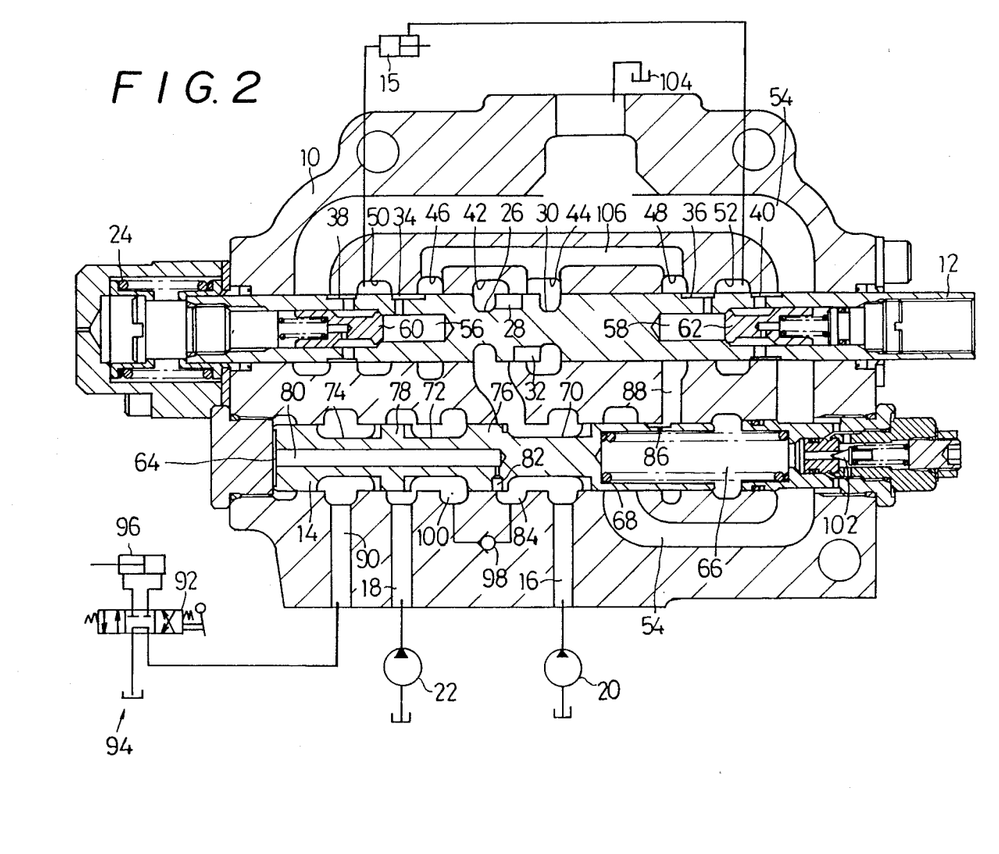
FIG. 2 is a vertical sectional view showing an embodiment of a hydraulic control apparatus for a vehicle according to the present invention.

FIG. 2 shows an embodiment of a hydraulic control apparatus for a vehicle according to the present invention. A hydraulic control apparatus of the illustrated embodiment generally includes a valve body 10, a steering spool 12 and a single flow control valve spool 14 housed in the valve body 10, and a steering cylinder 15 arranged at the outside of the valve body 10. The valve body 10 is formed therein with pump ports 16 and 18, which are connected to a first pump or steering pump 20 and a second pump or switch pump 22, respectively.

The steering spool 12 is engaged at one end thereof with a centering spring 24 which acts thereon and outwardly projected at the other end thereof from the valve body 10. The other end of the steering spool 12 is connected to an actuation rod (not shown). The steering spool 12 is provided at an intermediate portion thereof with a first annular recess 26 and a first notch 28 contiguous thereto and a second annular recess 30 and a second notch 32 contiguous thereto. Also, the steering spool 12 has a third annular recess 34 and a fifth annular recess 38 formed thereon in a manner to be arranged on the outside of the first annular recess 26 in order and a fourth annular recess 36 and a sixth annular recess 40 formed thereon in a manner to be arranged on the outside of the second annular recess 30 in order. In FIG. 2, the steering spool 12 is at a neutral position.

Correspondingly, the valve body 10 is formed on an inner surface opposite to the steering spool 12 with first to fourth annular grooves 42, 44, 46 and 48. In addition, the valve body is formed at portions thereof outside of the third and fourth annular grooves 46 and 48 with actuator ports 50 and 52 communicating with the steering cylinder 15, respectively. The grooves 42 to 48 are arranged in such a manner that when the steering spool 12 is at the neutral position, the first and second annular grooves 42 an 44 are opposite to the first and second annular recesses 26 and 30 to interrupt communication between the first and second annular recesses 26 and 30 and the third and fourth annular grooves 46 and 48 communicate with the third and fourth annular recesses 34 and 36. Also, the neutral position of the steering spool 12 causes communication between the third and fourth annular recesses 34, 36 and the actuator ports 50. 52 to be interrupted. Further, the fifth and sixth annular recesses 38 and 40 are prevented from communicating with the actuator ports 50 and 52 but communicate with a tank passage 54 defined in the valve body 10.

The steering spool 12 is formed with a pair of holes 56 and 58 which are arranged in a manner to axially inwardly extend from both ends thereof. The holes 56 and 58 serve to communicate the third and fourth annular recesses 34 and 36 with the fifth and sixth annular recesses 38 and 40 therethrough, respectively. In the holes 56 and 58 are received check valves 60 and 62 which serve to permit fluid to flow only in directions from the third and fourth annular recesses 34 and 36 to the fifth and sixth annular recesses 38 and 40, respectively.

The flow control valve spool 14 is positioned at one end thereof in a pilot chamber 64 and at the other end thereof in a spring chamber 66 which receives therein a spring 68 acting on the other end of the flow control valve spool 14. In FIG. 2, the spool 14 is kept at a normal position by the spring 68. The flow control valve spool 14 is formed thereon with first to third annular recesses 70, 72 and 74 in order from the other end to the one end, so that first and second lands 76 and 78 may be defined on the spool 14 between the first and annular recesses 70 and, 72 and between the second and third annular recesses 72 and 74, respectively.

The flow control valve spool 14 is also formed with a pilot passage 80 axially inwardly extend from the one end thereof. The first land 76 is communicate with the pilot passage 80 through a path 82 formed in the spool 14 to extend therebetween. The valve body 10 is formed at a portion thereof adjacent to the first land 76 with a passage 84 communicating with the path 82 and the first annular groove 42. This results in the pilot chamber 64 communicating through the pilot passage 80 and path 82 to the passage 84. Also, the spring chamber 66 communicates through an orifice 86 and a passage 88 with the fourth annular groove 48.

The flow control valve spool 14, when it is at the normal position shown in FIG. 2, causes the pump port 16 to be communicate through the first annular recess 70 with the passage 84 in a fully open state and interrupts communication between the pump port 18 and an implement port 90 formed in the valve body 10 so as to communicate with the third annular recess 74. The implement port 90 is connected through a change-over valve 92 of an implement circuit 94 to an actuator 96.

Reference numeral 98 designates a check valve provided in the flow control valve spool 14, which acts to permit fluid to flow only in a direction from a relay passage 100 to the passage 88. The relay passage 100 communicates with the pump port 18 in a fully open state when the flow control valve spool 14 is at the normal position. Reference numeral 102 indicates a relief valve for controlling pressure in the spring chamber 66.

Now, the manner of operation of the hydraulic control valve of the illustrated embodiment constructed as described above will be described hereinafter with reference to FIGS. 2 to 5.

When the steering spool 12 is held at the neutral position shown in FIG. 2, the spring chamber 66 communicates with the tank passage 54 through the orifice 86, passage 88, fourth annular groove 48, fourth annular recess 36, hole 58, check valve 62 and sixth annular recess 40 in order.

Figure 3:
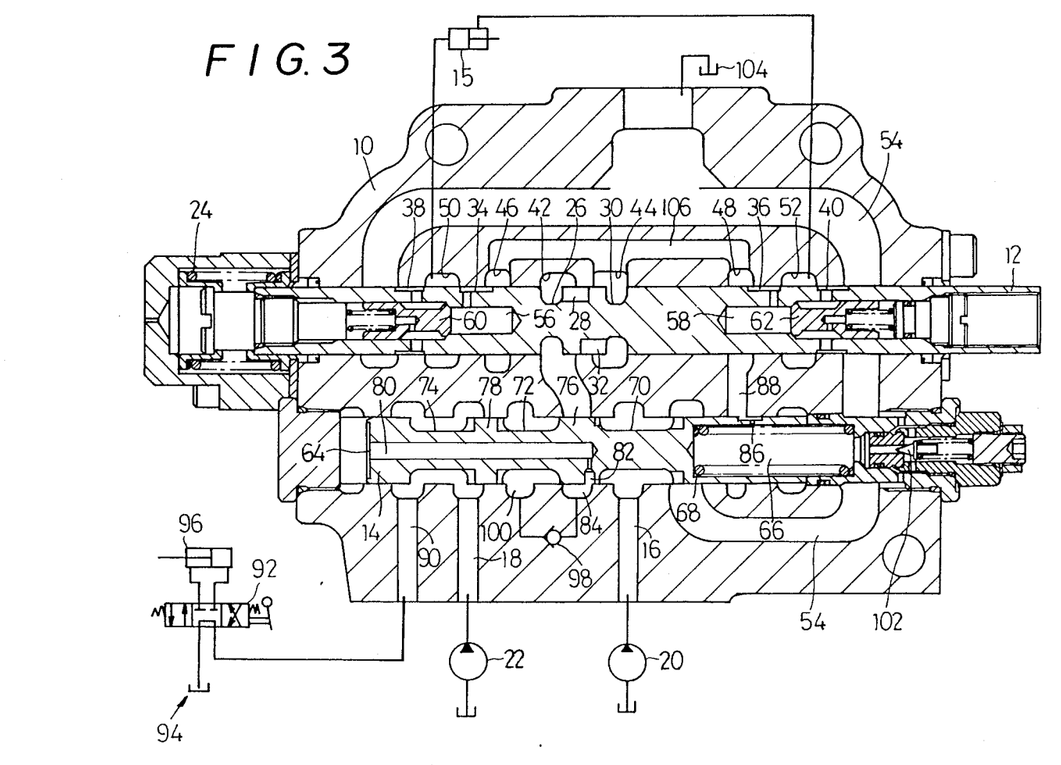
FIGS. 3 and 4 are each a vertical sectional view showing operation of the hydraulic control apparatus shown in FIG. 2.
Figure 4:
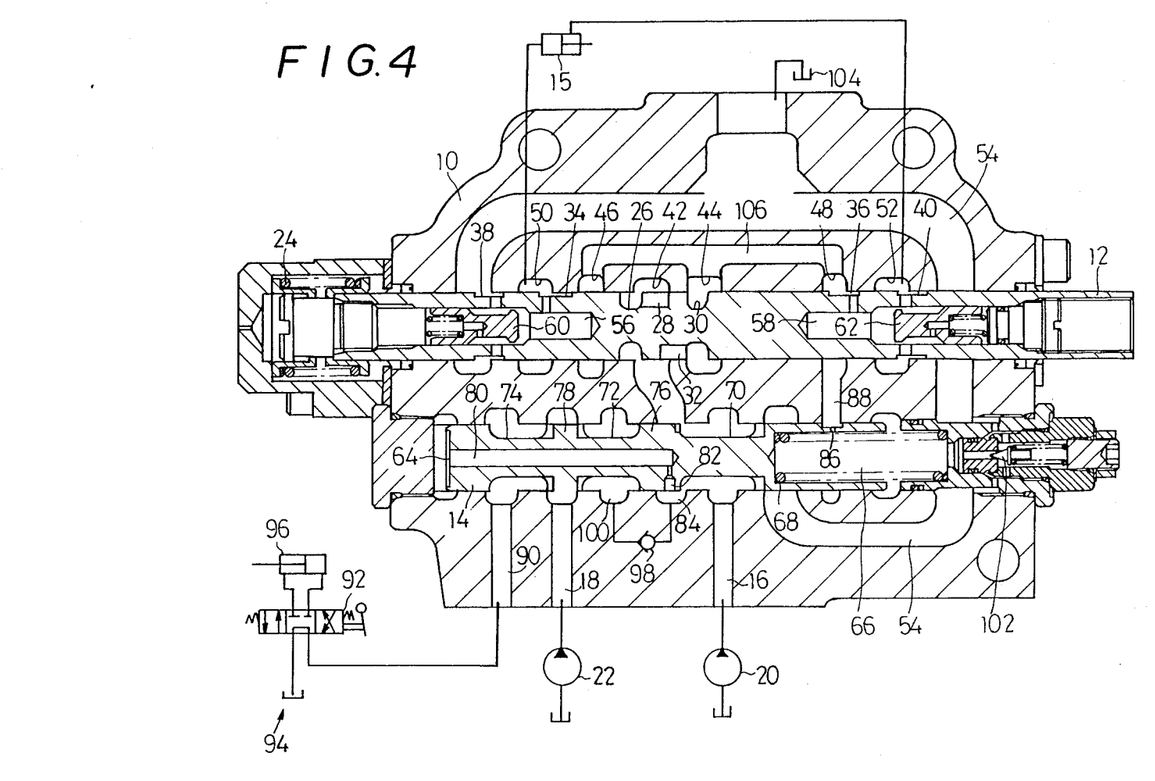
Figure 5:
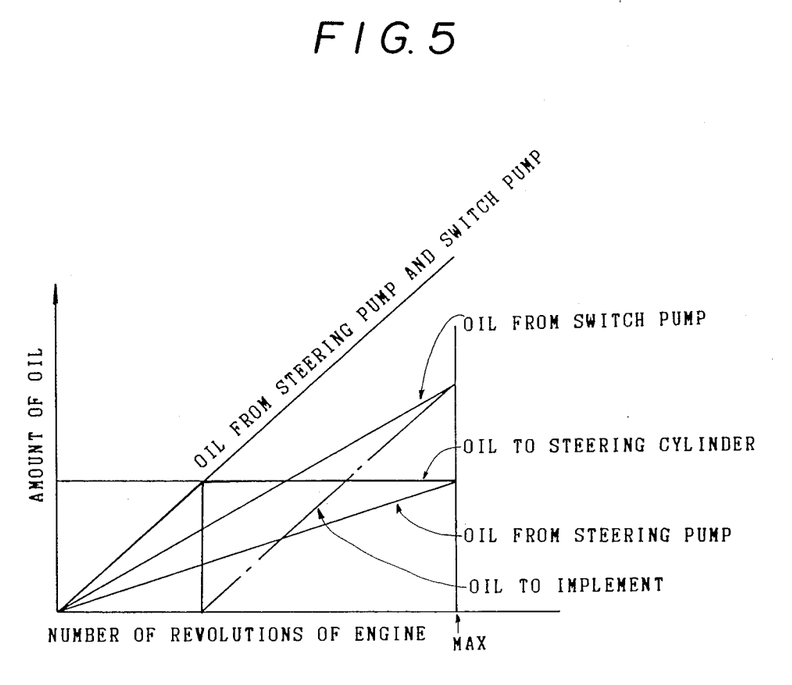
FIG. 5 is a graphical representation showing an example of control characteristics of a hydraulic control apparatus for a vehicle according to the present invention.

When the pumps 20 and 22 are driven at the neutral state of the steering spool 12, discharge pressure of the steering pump 20 is transmitted to the pilot chamber 64 through the pump port 16, passage 84 and pilot passage 80, so that the flow control valve spool 14 may be moved or shifted against the spring 86. This results in the flow control valve spool 14 reaching its stroke end as shown in FIG. 3. Such movement of the flow control valve spool 14, as shown in FIG. 3, causes communication between the pump port 16 and the tank passage 54 to be carried out through the first annular recess 70, so that all oil discharge from the steering pump 20 may be supplied to a tank 104 communicating with the tank passage 54.

Also, the pump port 18 fully communicates through the third annular recess 74 with the implement port 90. Accordingly, all oil discharged from the switch pump 22 is supplied to the changer-over valve 92 of the implement circuit 94.

Further, a pressure difference occurs at the first annular recess 70 depending on the degree of opening of the recess 70 with respect to the tank passage 54, and pressure on an upstream side of the recess 70 is applied to the pilot chamber 64. This results in the flow control valve spool 14 being stopped at a position where the pressure is balanced with force of the spring 68. For example, when the first annular recess 70 is substantially open with respect to the tank passage 54 to cause pressure on the side of the pump port 16 to approach pressure in the tank 104, the flow control valve spool 14 is returned in a left direction in FIG. 2 to a position at which force of the spring 68 is balanced with the tank pressure. On the contrary, when the degree of opening of the first annular recess with respect to the tank passage 54 is small, pressure in the pilot chamber 64 overcomes force of the spring 68 to move the flow control valve spool 14 in a right direction.

Now, when the steering spool 12 is moved in a left direction in FIG. 2, the degree of opening of the notch 32 with respect to the first annular groove 42 is determined depending on the amount of movement of the spool 12. In this instance, the notch 32 cooperates with the first annular groove 42 to form a variable constriction. Movement of the steering spool 12 in the left direction causes the actuator port 50 and fifth annular recess 38 to communicate with the third annular recess 34 and tank passage 54, respectively. Also, the fourth annular recess 36 communicating with the fourth annular groove 48 and the sixth annular recess 40 communicates with the actuator port 53.

When oil passes through the above-described variable constriction in such a state as described above, a pressure difference occurs at the variable constriction. Pressure on an upstream side of the variable constriction is applied through the passage 84 and pilot passage 80 to the pilot chamber 64, whereas pressure on a downstream side thereof is applied through the notch 32, the second annular recess 30, a passage 106, the fourth annular groove 48, the passage 88 and the orifice 86 in turn to the spring chamber 66. The pressure difference at the variable constriction formed by cooperation between the notch 32 and the annular groove 42 varies depending on the degree of opening thereof, and movement of the flow control valve spool 14 is controlled depending on the pressure difference. This results in the flow control valve spool 14 being moved from a position shown in FIG. 3 to that shown in FIG. 4 in the left direction.

In a state shown in FIG. 3, all oil discharged from the steering pump 20 is supplied to a rod side chamber of the steering cylinder 15 through the passage 84, first annular groove 42, first annular recess 26, notch 32, second annular recess 30, second annular groove 44, passage 106, fourth annular groove 48, fourth annular recess 36, hole 58, check valve 62, sixth annular recess 40 and actuator port 52 in turn. At this time, operating fluid in a bottom side chamber of the steering cylinder 15 is returned through the actuator port 50, fifth annular recess 38 and tank passage 54 to the tank T. This results in the steering cylinder 15 being contracted.

The pump port 18 communicating with the switch pump 22 communicates through the third annular recess 74 with the implement port 90 and through the second annular recess 72 with the relay passage 100. Accordingly, a part of oil discharged from the switch pump 22 is supplied through the relay passage 100 and check valve 98 to the passage 84, merges with oil discharged from the steering pump 20, and then is supplied to the steering cylinder 15. The remaining part of the oil is supplied to the actuator 71 of the implement circuit 94.

In such a state, an increase in the amount of oil discharged from the steering pump 20 causes a pressure difference at the variable constriction to be increased to deteriorate pressure balance between the pilot chamber 64 and the spring chamber 66, resulting in the flow control valve spool 14 being shifted in a right direction. Such movement of the spool 14 causes the degree of opening of a passage extending between the pump port 18 and the relay passage 100 to be decreased an the degree of opening of a passage between the pump port 18 and the implement port 90 to be increased. Thus, the amount of oil supplied to the actuator 96 on the implement side is increased by an increment of oil discharged from the steering pump 20.

Such relationships as described above are shown in FIG. 5. A sum of oil discharged from the steering pump 20 and that discharged from the switch pump 22 is supplied to the steering cylinder 15 until the amount of oil supplied thereto reaches a predetermined control level. When the amount of the oil reaches the control level, a part of oil discharged from the switch pump 22 is supplied to the implement circuit 94 and finally all oil discharged therefrom is fed to the circuit 94.

A principle of the present invention is likewise applied to a case that the steering spool 12 is moved in the right direction. Movement of the flow control valve spool is controlled depending on the degree of opening of the notch 28, and a portion of discharged oil from switch pump 22 which is to be supplied to the implement side is controlled depending on movement of the spool 14.

As can be seen from the foregoing, the hydraulic control apparatus of the present invention is highly simplified in structure because only one flow control valve is used. Also, the present invention effectively prevents a variation of characteristics of the valve from substantially affecting the whole control characteristics of the apparatus.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A hydraulic control apparatus for a vehicle comprising:
   a steering cylinder;
   a first pump and a second pump each connected to said steering cylinder;
   a first flow passage arranged between said first pump and said steering cylinder;
   a variable construction provided in said first flow passage;
   a steering spool for changing over said first flow passage and controlling the degree of opening of said variable constriction;
   an implement circuit;
   a second flow passage arranged between said second pump and said implement circuit;
   a single flow control valve spool which changes over depending on a variation of pressure on an upstream side of said variable constriction and varies the degree of opening of said second flow passage depending on a variation of pressure on said upstream side of said variable constriction.

2. A hydraulic control apparatus as defined in claim 1, wherein said first pump is a steering pump and said second pump is a switch pump.

3. A hydraulic control apparatus as defined in claim 1, wherein said flow control valve spool increases and decreases the degree of opening of said second flow passage corresponding to an increase and a decrease in pressure on said upstream side of said variable constriction.

4. A hydraulic control apparatus as defined in claim 1, wherein said steering spool varies the degree of opening of said variable constriction depending on the amount of movement thereof.

5. The apparatus of claim 1, comprising one, and only one flow control valve spool.

6. The apparatus of claim 1, wherein said single flow control valve spool additionally controls pressure fluid from said first pump.

7. A hydraulic control apparatus as defined in claim 2, wherein a sum of the amount of oil discharged from said steering pump and oil discharged from said switch pump is supplied to said steering cylinder until said sum reaches a predetermined control level.

8. The apparatus of claim 3, wherein said single flow control valve spool additionally defines direction of flow along said first flow passage.

9. A hydraulic control apparatus for a vehicle comprising:
- a steering cylinder;
- a steering pump connected to said steering cylinder;
- a switch pump connected to said steering cylinder;
- a first flow passage arranged between said steering cylinder and said steering pump;
- a variable constriction provided in said first flow passage;
- a steering spool for changing over said first flow passage and controlling the degree of opening of said variable constriction;
- an implement circuit;
- a second flow passage passage arranged between said switch pump and said implement circuit;
- a single flow control valve spool changing over depending on a variation of pressure on an upstream side of said variable constriction and increasing and decreasing the degree of opening of said second flow passage corresponding to an increase and a decrease in pressure on said upstream side of said variable constriction.

10. The apparatus of claim 9, comprising one, and only one flow control valve spool.

11. The apparatus of claim 9, wherein said single flow control valve spool additionally controls pressure fluid from said steering pump.

12. The apparatus of claim 9, wherein said single flow control valve spool additionally defines direction of flow along said first flow passage.

* * * * *

UNITED STATES PATENT AND TRADEMARK OFFICE
CERTIFICATE OF CORRECTION

PATENT NO. : 4,836,087
DATED : June 6, 1989
INVENTOR(S) : Yukinao NAKAGOMI

It is certified that error appears in the above—identified patent and that said Letters Patent is hereby corrected as shown below: Title page, the following should be inserted.

--(30)  Foreign Application, Priority Data
        NOV. 7, 1986 (JP) Japan ..... 61-26520--

Signed and Sealed this

Sixth Day of August, 1991

*Attest:*

HARRY F. MANBECK, JR.

*Attesting Officer*     *Commissioner of Patents and Trademarks*